(12) United States Patent
Hayamizu et al.

(10) Patent No.: US 11,760,910 B2
(45) Date of Patent: *Sep. 19, 2023

(54) PRESSURIZED CONTAINER SYSTEM

(71) Applicant: AGC Inc., Tokyo (JP)

(72) Inventors: Hiroki Hayamizu, Chiyoda-ku (JP); Masato Fukushima, Chiyoda-ku (JP)

(73) Assignee: AGC Inc., Tokyo (JP)

( * ) Notice: Subject to any disclaimer, the term of this patent is extended or adjusted under 35 U.S.C. 154(b) by 0 days.

This patent is subject to a terminal disclaimer.

(21) Appl. No.: 17/875,481

(22) Filed: Jul. 28, 2022

(65) Prior Publication Data

US 2022/0372356 A1    Nov. 24, 2022

Related U.S. Application Data

(63) Continuation of application No. 16/830,502, filed on Mar. 26, 2020, now Pat. No. 11,441,059, which is a continuation of application No. PCT/JP2018/036102, filed on Sep. 27, 2018.

(30) Foreign Application Priority Data

Sep. 28, 2017    (JP) .................................. 2017-187614

(51) Int. Cl.
*C09K 3/30* (2006.01)
*B65D 83/14* (2006.01)

(52) U.S. Cl.
CPC .............. *C09K 3/30* (2013.01); *B65D 83/752* (2013.01); *C09K 2205/122* (2013.01); *C09K 2205/126* (2013.01)

(58) Field of Classification Search
CPC ................................. C09K 3/30; B65D 83/752
See application file for complete search history.

(56) References Cited

U.S. PATENT DOCUMENTS

| 11,441,059 B2 * | 9/2022 | Hayamizu ............... C09K 3/30 |
| 2007/0007488 A1 | 1/2007 | Singh et al. |
| 2013/0292599 A1 | 11/2013 | Robin |
| 2014/0077122 A1 | 3/2014 | Fukushima |

(Continued)

FOREIGN PATENT DOCUMENTS

| JP | 2014-530939 A | 11/2014 |
| JP | 2016-104873 A | 6/2016 |

(Continued)

OTHER PUBLICATIONS

International Search Report dated Dec. 25, 2018 in PCT/JP2018/036102 filed Sep. 27, 2018, citing documents AA-AB and AO-AP therein, 2 pages.

*Primary Examiner* — Peter F Godenschwager
(74) *Attorney, Agent, or Firm* — Oblon, McClelland, Maier & Neustadt, L.L.P.

(57) ABSTRACT

To provide a propellant which has sufficient propelling performance and of which a component to be sprayed imposes low environmental burden, a propellant composition and a sprayer. A propellant composition comprising a propellant containing 1-chloro-2,3,3,3-tetrafluoropropene and a pressurizing agent, and a sprayer comprising the propellant composition, a container in which the propellant composition is contained, and a spray unit to spray the propellant composition to the outside of the container.

14 Claims, 1 Drawing Sheet

(56) References Cited

U.S. PATENT DOCUMENTS

2014/0305667 A1    10/2014   Robin
2018/0354874 A1    12/2018   Nomura et al.
2020/0230454 A1     7/2020   Robin et al.

FOREIGN PATENT DOCUMENTS

JP          2017-44399 A    3/2017
JP          2017-61704 A    3/2017
WO    WO 2017/146189 A1    8/2017

* cited by examiner

PRESSURIZED CONTAINER SYSTEM

CROSS-REFERENCE TO RELATED APPLICATIONS

The present application is a continuation of U.S. application Ser. No. 16/830,502, now allowed, having a filing date of Mar. 26, 2020 which is a continuation of International Application PCT/JP2018/036102 having a filing date of Sep. 27, 2018 and which claims priority to Japanese Patent Application JP 2017-187614 having a filing date of Sep. 28, 2017, incorporated herein by reference in its entirety.

TECHNICAL FIELD

The present invention relates to a propellant, a propellant composition and a sprayer.

BACKGROUND ART

Heretofore, in a sprayer which sprays a propellant or a chemical agent together with a propellant, as the propellant, a hydrofluorocarbon (HFC), for example, 1,1,1,2-tetrafluoroethane (HFC-134a) has been used. Among HFCs, HFC-134a is incombustible and has less influence over the ozone layer, but is known to have a high global warming potential (GWP).

Accordingly, in recent years, a hydrofluoroolefin (HFO), a hydrochlorofluoroolefin (HCFO) and a chlorofluoroolefin (CFO) having a carbon-carbon double bond, which is easily decomposed by OH radicals in the air, and thereby having less influence over the ozone layer and a low GWP, that is, imposing less burden to global environment, have been expected (for example, Patent Document 1). In this specification, unless otherwise specified, a saturated HFC will be referred to as a HFC and is distinguished from a HFO. Further, a HFC may sometimes be referred to as a saturated hydrofluorocarbon.

Among them, for example, 1-chloro-2,3,3,3-tetrafluoropropene (HCFO-1224yd) as a HCFO imposes less burden on global environmental and has low toxicity and is incombustible, and is thereby expected as a propellant. However, the boiling point of Z-form HCFO-1224yd is so high as 14° C., and its propelling performance is insufficient when used by itself.

PRIOR ART DOCUMENTS

Patent Documents

Patent Document 1: JP-A-2016-104873

DISCLOSURE OF INVENTION

Technical Problem

Under these circumstances, it is an object of the present invention to provide a propellant which has sufficient propelling performance and of which a component to be sprayed imposes less environmental burden, a propellant composition, and a sprayer.

Solution to Problem

The present invention provides a propellant, a propellant composition and a sprayer having the following constitutions.

[1] A propellant composition comprising a propellant containing 1-chloro-2,3,3,3-tetrafluoropropene (HCFO-1224yd) and a pressurizing agent.

[2] The propellant composition according to [1], wherein the pressurizing agent is at least one member selected from propane, butane, isobutane, dimethyl ether, a hydrofluoroolefin, a hydrofluorocarbon, carbon dioxide, compressed air, nitrous oxide and nitrogen.

[3] The propellant composition according to [1] or [2], which further contains a spray chemical agent.

[4] The propellant composition according to any one of [1] to [3], wherein the vapor pressure of the propellant composition at 0° C. is higher than atmospheric pressure.

[5] The propellant composition according to any one of [1] to [4], wherein the proportion of 1-chloro-2,3,3,3-tetrafuoropropene to the total amount of the propellant is at least 10 mass % and at most 90 mass %.

[6] The propellant composition according to any one of [1] to [5], wherein the 1-chloro-2,3,3,3-tetrafluoropropene consists of (Z)-1-chloro-2,3,3,3-tetrafluoropropene and (E)-1-chloro-2,3,3,3-tetrafluoropropene, and the proportion of (Z)-1-chloro-2,3,3,3-tetrafluoropropene to the total amount of 1-chloro-2,3,3,3-tetrafluoropropene is at least 50 mass % and at most 99.99 mass %.

[7] A sprayer comprising the propellant composition as defined in any one of [1] to [6], a container in which the propellant composition is contained, and a spray unit to spray the propellant composition to the outside of the container.

[8] A propellant containing 1-chloro-2,3,3,3-tetrafluoropropene (HCFO-1224yd) and a pressurizing agent.

[9] The propellant according to [8], wherein the pressurizing agent is at least one member selected from propane, butane, isobutane, dimethyl ether, a hydrofluoroolefin, a hydrofluorocarbon, carbon dioxide, compressed air, nitrous oxide and nitrogen.

[10] The propellant according to [8] or [9], wherein the proportion of 1-chloro-2,3,3,3-tetrafuoropropene to the total amount of the propellant is at least 10 mass % and at most 90 mass %.

Advantageous Effects of Invention

According to the present invention, a propellant which has sufficient propelling performance and of which a component to be sprayed imposes less environmental burden, a propellant composition, and a sprayer, can be provided.

DESCRIPTION OF EMBODIMENTS

Figure 1:
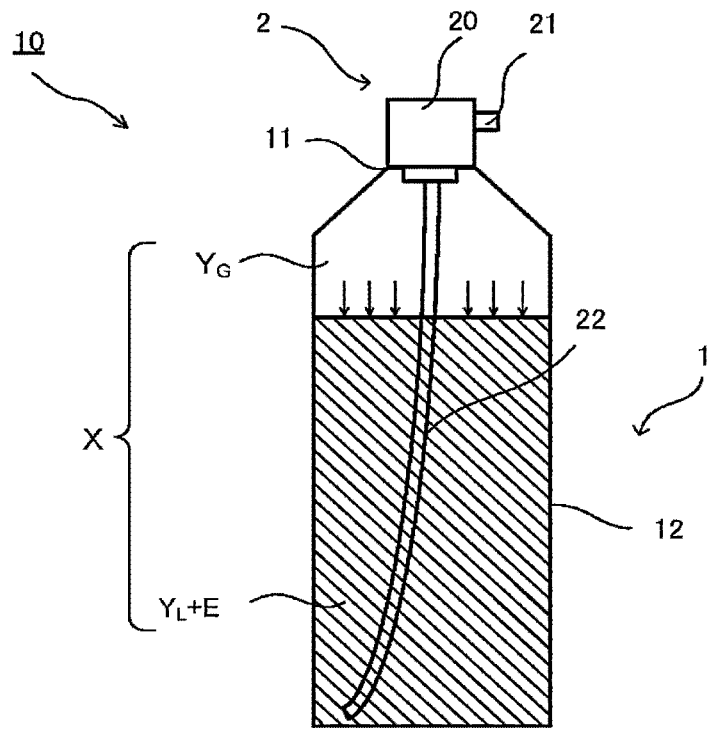
FIG. 1 is a schematic view illustrating an example of the sprayer of the present invention.

Now, the present invention will be described.

In this specification, abbreviated names of halogenated hydrocarbon compounds are described in brackets after the compound names, and the abbreviated names are employed instead of the compound names as the case requires. Further, as abbreviated names, only numerals and small alphabet letters after a hyphen (-) (for example, "1224yd" in the case of "HCFO-1224yd") may be used.

Further, (E) before the compound name or after its abbreviated name of a compound having cis-trans isomers represents an E-form (trans-isomer) and (Z) represents a Z-form (cis-isomer). The compound name or the abbreviated name without description of E or Z generally means E-form, Z-form and a mixture of E-form and Z-form.

In this specification, evaluation of "combustibility" is based on the following standards.

In combustion test carried out with respect to a mixture of a specimen and air in a container controlled at 60° C.±3° C. under 101.3 kPa±0.7 kPa in facilities as specified in ASTM E-681-09, when the mixture has no combustibility in the entire range of a proportion of the specimen to the total volume of the mixture being higher than 0 vol % and up to 100 vol %, such a specimen is evaluated to "have no combustibility". The wording "incombustible" is synonymously used with the wording "having no combustibility". When a mixture of a specimen and air has combustibility in any proportion, such a specimen is evaluated to "have combustibility" or to "have a combustible range".

In the combustion test, in the vicinity electrodes disposed at a height of one third from the bottom of the container, the mixture is burnt by discharge ignition under 15 kV at 30 mA for 0.4 second, spread of flame is visually confirmed, and when the angle of spread of the flame upward is at least 90 degrees, such a specimen is evaluated to have combustibility, and when the angle is less than 90 degrees, such a specimen is evaluated to have no combustibility.

In this specification, GWP is a value (100 years) in Intergovernmental Panel on Climate Change (IPCC), Fifth assessment report (2014), or a value measured in accordance therewith. Further, GWP of a mixture is represented by a weighted average by the composition mass.

In this specification, "spraying" means that a propellant composition filled in the interior of a sprayer is sprayed from the interior of the sprayer to the outside in a liquid state, a gaseous state, a solid state or a mixed state thereof.

In this specification, "to" used to show the range of the numerical values is used to include the upper and lower limit values.

Now, the sprayer using the propellant composition of the present invention according to the embodiment of the present invention will be described with reference to Drawings.

Sprayer

The sprayer of the present invention comprises a container in which a propellant composition is contained, and a spray units to spray the propellant composition to the outside of the container, and is characterized by using as the propellant composition the propellant composition of the present invention. That is, as the member constituting the sprayer of the present invention, a member constituting a known sprayer, for example, a container and a spray unit may be used without any particular restriction, except that the propellant composition of the present invention is used as the propellant composition.

Figure 2:
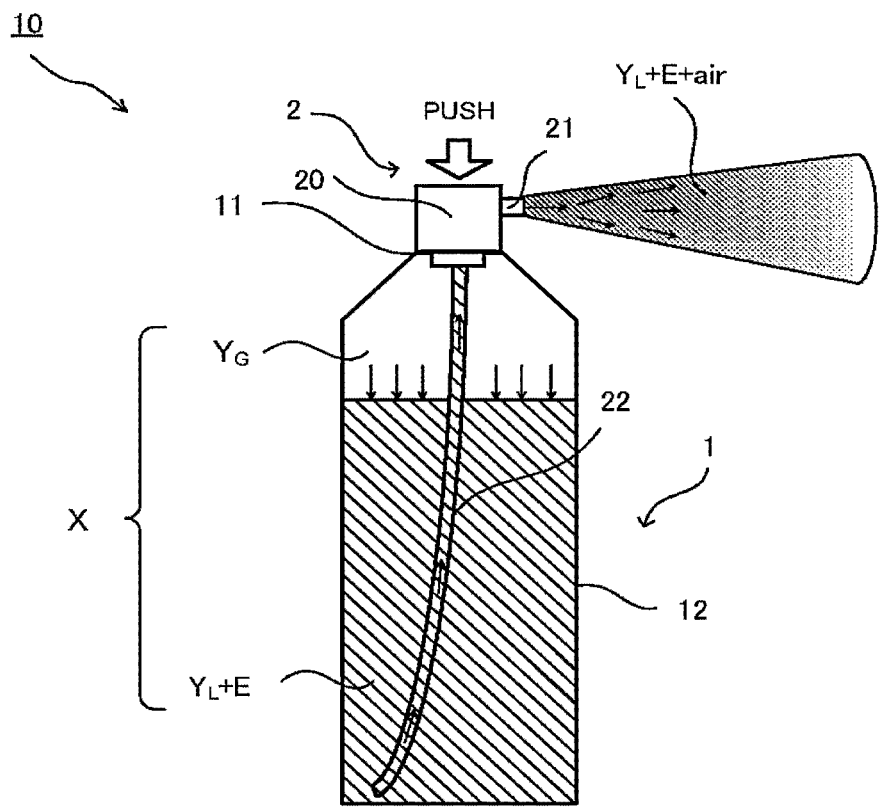
FIG. 2 is a schematic view illustrating a state when the sprayer shown in FIG. 1 is used.

FIG. 1 is a schematic view illustrating an example of the sprayer of the present invention, and FIG. 2 is a schematic view illustrating a state where the sprayer shown in FIG. 1 is used. In FIG. 1, a sprayer 10 comprises a container 1, a propellant composition X contained in the interior of the container 1, and a spray unit 2 to spray the propellant composition X to the outside of the container 1. In FIG. 1, the propellant composition X is a propellant composition comprising a propellant Y ($Y_G$ and $Y_L$) containing 1224yd and a pressurizing agent and a spray chemical agent E. In the present invention, the propellant composition may consist solely of the propellant.

In FIG. 1, the container 1 has an accommodating portion 12 and an opening 11. The spray unit 2 is attached to the opening 11 of the container 1, and has a function to seal the interior of the container 1. The propellant composition X in the container 1 forms a gaseous phase portion and a liquid phase portion in the interior of the container 1. The gaseous phase portion consists of the propellant $Y_G$ in a gaseous phase, and the liquid phase portion is constituted by a mixture of the propellant $Y_L$ in a liquid phase and the spray chemical agent E. The propellant Y is constituted by the propellant $Y_G$ in a gaseous phase and the propellant $Y_L$ in a liquid phase.

The spray unit 2 has a button 20, a spray nozzle 21 and a nozzle 22 which extends from the button 20 to the bottom of the container 1. The sprayer 10 is in a sealed state in the state shown in FIG. 1. At the time of use shown in FIG. 2, by pushing the button 20 of the spray unit 2, the liquid phase portion is brought in from the tip of the nozzle 22 and via the nozzle 22 and a flow path in the spray unit 2, sprayed from the spray nozzle 21.

Discharge of the liquid phase portion from the spray nozzle 21 using the spray unit 2 is carried out utilizing the propellant $Y_G$ in a gaseous phase. In the state shown in FIG. 1, in the spray unit 2, the flow path is clogged with e.g. a gasket. And, at the time of use, as shown in FIG. 2, by pushing the button 20, the gasket moves down and the flow path is opened, and the liquid phase portion is discharged from the spray nozzle 21 by the pressure of the gaseous phase portion.

Arrows shown in the gaseous phase portion in FIGS. 1 and 2 represent the pressure applied from the gaseous phase portion to the liquid phase portion. In FIG. 2, further, the flow of the liquid phase portion when discharged is shown by arrows.

The vapor pressure of the propellant composition of the present invention at 0° C. is higher than the pressure of the outside of the container, usually atmospheric pressure. The propellant composition is adjusted preferably so that the pressure in the container is within a range specified by High Pressure Gas Safety Act, that is, at most 0.8 MPaG at 35° C. The vapor pressure of the propellant composition is usually the vapor pressure of the propellant. "G" in the pressure unit represents gage pressure. Now, the propellant composition of the present invention will be described.

Propellant Composition

The propellant composition of the present invention comprises a propellant. The propellant contains 1224yd and a pressurizing agent. The propellant composition may consist solely of the propellant, or may contain a spray chemical agent in addition to the propellant. Further, it may contain as the case requires, a component other than the propellant and the spray chemical agent (hereinafter sometimes referred to as "other component").

Propellant

The propellant is a component which has a function to adjust the pressure of the propellant composition in the container of the sprayer higher than atmospheric pressure which is the pressure outside the container in use environment, that is, propelling performance. In the propellant, the pressurizing agent is a component to assist the propelling performance of 1224yd. In this specification, unless otherwise specified, the boiling point is a value measured under atmospheric pressure, that is, under a pressure of 0.101 MPa.

As an index of propelling performance, the vapor pressure of the propellant at 0° C. is preferably higher than atmospheric pressure (=0.101 MPa). When the vapor pressure of the propellant at 0° C. is higher than atmospheric pressure, the vapor pressure of the propellant composition at 0° C. can be made higher than atmospheric pressure. The propellant preferably has a vapor pressure in a liquid phase at 35° C. of at most 0.8 MPaG (=0.901 MPa). When the vapor pressure of the propellant in a liquid phase at 35° C. is at most 0.8 MPaG, the propellant composition meets specifications of High Pressure Gas Safety Act.

1224yd contained in the propellant is incombustible. The propellant preferably has no combustibility, however, according to the type of the pressurizing agent and the proportion of 1224yd and the pressurizing agent, the propellant may have combustibility. However, even when the propellant has combustibility, the propellant composition of the present invention can be used without any problem by paying attention to use environment. In a case where the propellant has combustibility, the heat of combustion of the propellant is preferably at most 30 MJ/kg, more preferably at most 20 MJ/kg.

1224yd

1224yd ($CF_3$—CF=CHCl) contained in the propellant has halogen to suppress combustibility and a carbon-carbon double bond which is easily decomposable by OH radicals in the air, in its molecule. 1224yd has cis-trans isomers 1224yd(Z) and 1224yd(E). 1224yd(Z) has a boiling point of 15° C., and 1224yd(E) has a boiling point of 19° C. GWP of 1224yd(Z) is 1, and GWP of 1224yd(E) is <1. 1224yd(Z) has high chemical stability as compared with 1224yd(E).

Here, 1224yd, which has chlorine in its molecule, has very high solubility in an organic substance such as a process oil, and can be used for degreasing-cleaning of process oil, flux cleaning, precision cleaning, etc. Further, it has excellent properties as a cleaning agent such as low surface tension, low viscosity and excellent permeability. Accordingly, 1224yd may be used not only as a propellant but also as a cleaning agent. Accordingly, the propellant composition of the present invention may be used as sprayed from the sprayer as described above, for example, for cleaning, even when constituted solely by the propellant without containing the after-described spray chemical agent.

1224yd(Z), 1224yd(E) and a mixture thereof, that is, 1224yd, is incombustible. Further, Occupational Exposure Limits (hereinafter sometimes referred to as OEL) of 1224yd is 1,000 ppm. As OEL of 1224yd, a value determined by OARS WEEL is employed.

OEL is the concentration limit of the exposure level to be controlled in air, to protect health of workers. It is usually the upper limit of the concentration tolerable for work for 5 days a week for 8 hours per day.

The proportion of 1224yd in the propellant is preferably from 1 to 99 mass %, more preferably from 10 to 90 mass % to the total amount of the propellant. In the 1224yd contained in the propellant, from the viewpoint of the chemical stability, the proportion of 1224yd(Z) to the total amount of 1224yd is preferably from 50 to 100 mass %, more preferably from 80 to 100 mass %, further preferably from 90 to 100 mass %, still more preferably from 99 to 100 mass %.

The upper limit value of the proportion of 1224yd(Z) is preferably 99.99 mass % from the viewpoint of production efficiency. That is, the proportion of 1224yd(Z) to the total amount of 1224yd is preferably from 50 to 99.99 mass % from the viewpoint of chemical stability and production efficiency.

As a method for producing 1224yd, for example, (I) a method of subjecting 1,2-dichloro-2,3,3,3-tetrafluoropropane (HCFC-234bb) to dehydrochlorination reaction or (II) a method of subjecting 1,1-dichloro-2,3,3,3-tetrafluoropropene (CFO-1214ya) to hydrogen reduction may be mentioned.

(I) Dehydrochlorination Reaction of 234bb

234bb is brought into contact with a base dissolved in a solvent, that is, a base in a solution state, in a liquid phase, to conduct dehydrochlorination reaction of 234bb. Further, 234bb may be produced, for example, by reacting 2,3,3,3-tetrafluoropropene (HFO-1234yf) and chlorine in a solvent.

(II) Method of Subjecting 1214ya to Hydrogen Reduction

1214ya is reduced using hydrogen in the presence of a catalyst so as to be converted to 1234yf, and 1224yd is obtained as an intermediate. By this reduction reaction, a variety of fluorinated compounds are formed as by-products in addition to 1224yd. 1214ya is produced, for example, by a method of subjecting 3,3-dichloro-1,1,1,2,2-pentafluoropropane (HCFC-225ca) and the like as raw materials to dehydrofluorination reaction in an alkaline aqueous solution in the presence of a phase transfer catalyst, or by a gaseous phase reaction in the presence of a catalyst such as chromium, iron, copper or activated carbon.

In each of the above production methods, 1224yd is obtained as a mixture of 1224yd(Z) and 1224yd(E). 1224yd (Z) or 1224yd(E) may be purified from the mixture by a known method and is used by itself, or the mixture of 1224yd(E) and 1224yd(Z) may be used.

Further, impurities which cannot be removed from 1224yd by purification may sometimes remain in a very small amount. The amount of such impurifies is preferably less than 1.5 mass % in total to the total amount of 1224yd. The impurities may be a raw material for production of 1224yd, an intermediate formed in the production process, etc. However, among the raw material for production and the intermediate, a compound which functions as the after-described pressurizing agent is regarded as a pressurizing agent.

Pressurizing Agent

A pressurizing agent is a component which assists propelling performance of 1224yd, and has a boiling point of less than 14° C. The boiling point of the pressurizing agent is preferably at most 0° C., more preferably at most −10° C., particularly preferably at most −20° C. Further, from the viewpoint of pressure drop, the boiling point of the pressurizing agent is preferably at least −75° C., more preferably at least −50° C. The pressure drop means a decrease of the pressure of the propellant composition in the container of the sprayer from the initial state when used. If the pressure drop occurs during use, the propelling performance will be lowered, and in some cases, a part of the propellant composition in the container may not be sprayed to the outside of the container.

The pressurizing agent preferably has a vapor pressure in a liquid phase at 0° C. higher than atmospheric pressure when used for a propellant in combination with 1224yd. The pressurizing agent preferably has a vapor pressure in a liquid phase at 35° C. of at most 0.8 MPaG when used for a propellant in combination with 1224yd.

The pressurizing agent is preferably incombustible but may have combustibility. The combustibility of the pressurizing agent is such that the heat of combustion is at most 30 MJ/kg, more preferably at most 20 MJ/kg, when the pressurizing agent is used for a propellant in combination with incombustible 1224yd. The heat of combustion of the pressurizing agent is preferably, for example, at most 50 MJ/kg.

The pressurizing agent is selected considering GWP and OEL. GWP of the pressurizing agent is preferably such that when used for a propellant in combination with 1224yd having GWP of at most 1, GWP of the propellant can be made to be at most 100, more preferably at most 50, further preferably at most 10. GWP of the pressurizing agent is, for example, preferably at most 100, more preferably at most 50, particularly preferably at most 10.

OEL of the pressurizing agent is preferably such that when the pressurizing agent is used for a propellant in combination with 1224yd having OEL of 1,000 ppm, OEL of the propellant can be made to be at least 800 ppm. OEL of the pressurizing agent is, for example, preferably at least 500 ppm, more preferably at least 800 ppm, particularly preferably at least 1,000 ppm.

The proportion of the pressurizing agent in the propellant is preferably from 99 to 1 mass %, more preferably from 90 to 10 mass % to the total amount of the propellant.

The pressurizing agent may, for example, be specifically, propane (boiling point: −42° C.), butane (boiling point: −1° C.), isobutane (boiling point: −12° C.), dimethyl ether (DME, boiling point: −25° C.), a hydrofluoroolefin (HFO), a hydrofluorocarbon (HFC), carbon dioxide, compressed air, nitrous oxide, nitrogen or an inert gas. Among them, preferred is propane, butane, isobutane, dimethyl ether, a hydrofluoroolefin, a hydrofluorocarbon, carbon dioxide, compressed air or nitrogen. The HFO and HFC are a HFO and a HFC having a boiling point of less than 15° C. The pressurizing agent may be used alone or in combination of two or more.

With respect to propane, butane, isobutane and dimethyl ether, together with 1234yf and (E)-1,3,3,3-tetrafluoropropene (HFO-1234ze(E)) as the after-described HFOs, the boiling point, the vapor pressure (0° C., 35° C.), GWP, the heat of combustion, OEL, and the pressure change by a temperature change when used for a propellant ("propellant pressure change" in Table) are shown in Table 1. The propellant pressure change represents a difference between the pressure at a temperature of 0° C. and a pressure (0.4 MPaG) at a temperature of 35° C. of a propellant composition comprising 1224yd and each pressurizing agent at a temperature of 35° C. under 0.4 MPaG. The propellant pressure change is preferably at most 0.8 MPaG, more preferably at most 0.7 MPaG, further preferably at most 0.6 MPaG, particularly preferably at most 0.4 MPaG, most preferably at most 0.3 MPaG.

As shown in Table 1, propane, butane and isobutane are preferred in that they have low GWP and high OEL, and in that the pressure change by a temperature change when used for a propellant is small. When combined with 1224yd, the composition is adjusted so that the vapor pressure as the propellant at 0° C. is preferably higher than atmospheric pressure, and further the vapor pressure at 35° C. is at most 0.8 MPaG. Each of such compounds has a high heat of combustion by itself, and accordingly the composition with 1224yd is adjusted so that the heat of combustion of the obtained propellant is preferably at most 30 MJ/kg, more preferably at most 20 MJ/kg.

In a case where propane is used as the pressurizing agent, in order that the vapor pressure of the propellant at 0° C. is higher than atmospheric pressure, the proportion of propane to the total amount of 1224yd and propane is preferably at least 10 mass %. Further, in order that the vapor pressure of the propellant at 35° C. is at most 0.8 MPaG, the proportion of propane to the total amount of 1224yd and propane is preferably at most 40 mass %. In order that the heat of combustion of the propellant is at most 20 MJ/kg, the proportion of propane to the total amount of 1224yd and propane is preferably at most 30 mass %.

In a case where butane is used as the pressurizing agent, in order that the vapor pressure of the propellant at 0° C. is higher than atmospheric pressure, the proportion of butane to the total amount of 1224yd and butane is preferably at least 90 mass %. On the other hand, taking the heat of combustion of the propellant as an index, in order to adjust it to be at most 30 MJ/kg, the proportion of butane to the total amount of 1224yd and butane is preferably at most 60 mass %, and in order to adjust it to be at most 20 MJ/kg, the proportion is preferably at most 30 mass %.

In a case where isobutane is used as the pressurizing agent, in order that the vapor pressure of the propellant at 0° C. is higher than atmospheric pressure, the proportion of isobutane to the total amount of 1224yd and isobutane is preferably at least 30 mass %. On the other hand, taking the heat of combustion of the propellant as an index, in order to adjust it to be at most 30 MJ/kg, the proportion of isobutane to the total amount of 1224yd and isobutane is preferably at most 60 mass %, and in order to adjust it to be at most 20 MJ/kg, the proportion is preferably at most 30 mass %.

In a case where DME is used as the pressurizing agent, the composition with 1224yd is adjusted from the same viewpoint as those of propane, butane, isobutane, and the like. With respect to DME, in order that the vapor pressure of the propellant at 0° C. is higher than atmospheric pressure, the proportion of DME to the total amount of 1224yd and DME is preferably at least 10 mass %. On the other hand, taking the heat of combustion of the propellant as an index, in order to adjust it to be at most 20 MJ/kg, the proportion of DME to the total amount of 1224yd and DME is preferably at most 60 mass %.

TABLE 1

| | Boiling point [° C.] | Vapor pressure [MPa] | | GWP | Heat of combustion [MJ/kg] | OEL [ppm] | Propellant pressure change [MPaG] |
| --- | --- | --- | --- | --- | --- | --- | --- |
| | | 0° C. | 35° C. | | | | |
| Propane | −42 | 0.475 | 1.218 | 3 | 46.4 | 1000 | 0.31 |
| Butane | −1 | 0.103 | 0.328 | 15 | 45.7 | 1000 | — |

TABLE 1-continued

| | Boiling point | Vapor pressure [MPa] | | | Heat of combustion | OEL | Propellant pressure change |
|---|---|---|---|---|---|---|---|
| | [° C.] | 0° C. | 35° C. | GWP | [MJ/kg] | [ppm] | [MPaG] |
| Isobutane | −12 | 0.157 | 0.465 | 4 | 45.6 | 1000 | — |
| DME | −25 | 0.267 | 0.780 | 1 | 28.8 | 1000 | 0.33 |
| 1234yf | −29 | 0.316 | 0.895 | 1 | 10.7 | 500 | 0.33 |
| 1234ze(E) | −19 | 0.217 | 0.667 | 1 | 10.1 | 800 | 0.34 |

HFOs have low GWP as compared with HFCs, usually less than 10. The HFO may, for example, be specifically 1234yf, 1234ze or 1,1,1,4,4,4-hexafluoro-2-butene (HFO-1336mzz), and is preferably 1234yf (boiling point: −29° C., GWP: 1), 1234ze(E) (boiling point: −19° C., GWP: 1) or 1336mzz(Z) (boiling point: 9° C., GWP: 2).

Among the HFOs, both 1234yf and 1234ze(E) have a combustible range, but have GWP of 1 and a boiling point lower than that of 1224yd and are preferred in view of propelling performance. 1234yf is used preferably in a proportion of at least 20 mass % to the total amount of 1224yd and 1234yf in order that the vapor pressure of the propellant at 0° C. is higher than atmospheric pressure. Further, the proportion of 1234yf to the total amount of 1224yd and 1234yf is preferably at most 70 mass % from the viewpoint of combustibility.

1234ze(E) is used preferably in a proportion of at least 20 mass % to the total amount of 1224yd and 1234ze(E) in order that the vapor pressure of the propellant at 0° C. is higher than atmospheric pressure. Further, the proportion of 1234ze to the total amount of 1224yd and 1234ze is preferably at most 80 mass % from the viewpoint of combustibility.

The HFC may, for example, be 1,1-difluoroethane (HFC-152a, boiling point: −25° C.) or 1,1,1,2-tetrafluoroethane (HFC-134a, boiling point: −26° C.), and is preferably 134a. 134a is preferred in view of propelling performance in that the pressure drop is small. 134a is incombustible but has high GWP of 1430. GWP of the propellant can be lowered by combination with 1224yd, however, in a composition with which sufficiently low GWP is obtained, the propelling performance tends to be low.

Carbon dioxide, compressed air, nitrous oxide and nitrogen are pressurizing agents which are used usually without being liquified called compressed gas, so as to meet specifications of High Pressure Gas Safety Act. They are preferably used as the pressurizing agent in that they are incombustible, have low GWP and high OEL. Accordingly, sprayers using them are preferably used in such a way that they are consumed in several times considering the pressure drop.

The inert gas may, for example, be helium, argon, krypton, xenon or radon.

The pressurizing agent is preferably propane, DME, 1234yf or 1234ze(E) in view of propelling performance, more preferably DME, 1234yf or 1234ze(E), and further preferably 1234yf or 1234ze(E) in view of combustibility.

Other Component

The propellant contained in the propellant composition of the present invention preferably consists solely of 1224yd and the pressurizing agent, but may contain other component within a range not to impair the effects of the present invention. As other component, the above impurities in production of 1224yd may be mentioned.

The proportion of 1224yd and the pressurizing agent in the propellant is properly selected considering the propelling performance, GWP, combustibility, OEL, pressure drop, the change of propelling performance by the temperature environment, etc., in accordance with each compound used as the pressurizing agent, and specifically, the above proportion described for each compound may be mentioned.

The proportion of the propellant in the propellant composition of the present invention is preferably from 20 to 100 mass %, more preferably from 30 to 100 mass % to the total amount of the propellant composition.

Spray Chemical Agent

The propellant composition of the present invention may contain a spray chemical agent. As the spray chemical agent, a spray chemical agent known as a spray chemical agent used together with the propellant for the sprayer may be used without any particular restriction. Specifically, it may, for example, be a fungicide, a deodorant, a lubricant, an anticorrosive, an antistatic agent, an extreme pressure agent, an antifogging agent, a penetrating agent, a wetting agent, a coating material, a cleaning agent, a cosmetic, an external medicine, a dye, an antifouling agent, a water repellent or an oil repellent. The propellant, which contains 1224yd, dissolves the spray chemical agent well, and is suitably used for an application to which an obtainable coating film is required to have uniformity, for example, a lubricant or a coating material.

The proportion of the spray chemical agent in the propellant composition of the present invention is preferably from 0 to 80 mass %, more preferably from 0 to 70 mass % to the total amount of the propellant composition. Usually, the spray chemical agent has a boiling point considerably higher than that of 1224yd, and is not present in a gaseous phase portion in the sprayer or is present in a very small amount if any. Accordingly, the vapor pressure of the propellant composition can be regarded as being the same as the vapor pressure of the propellant.

Specifically, the propellant composition has a vapor pressure in a liquid phase at 0° C. of preferably higher than atmospheric pressure, and has a vapor pressure in a liquid phase at 35° C. of preferably at most 0.8 MPaG.

The heat of combustion of the propellant composition is preferably at most 30 MJ/kg, preferably at most 20 MJ/kg. The propellant composition has GWP of preferably at most 100, more preferably at most 50, further preferably at most 10. OEL of the propellant composition is preferably at least 800 ppm, more preferably at most 1,000 ppm.

Optional Component

The propellant composition of the present invention may optionally further contain a known additive such as a stabilizer. The stabilizer is a component which improves the stability of the propellant or the spray chemical agent against heat and oxidation. As the stabilizer, a known stabilizer which has been used for a propellant composition containing a halogenated hydrocarbon, for example, an oxidation resistance-improving agent, a heat resistance-improving agent and a metal deactivator may be used without any particular restriction. For the propellant composition to be used in the present invention, particularly a stabilizer to improve the stability of 1224yd is preferred.

The oxidation resistance-improving agent and the heat resistance-improving agent may, for example, be a phenol compound, an unsaturated hydrocarbon group-containing aromatic compound, an aromatic amine compound, an aromatic thiazine compound, a terpene compound, a quinone compound, a nitro compound, an epoxy compound, a lactone compound, an orthoester compound, a mono- or dialkali metal salt of phthalic acid, or a thiodiphenyl ether hydroxide compound.

Further, the metal deactivator may be a heterocyclic nitrogen-containing compound such as an imidazole compound, a thiazole compound or a triazole compound, an amine salt of an alkyl acid phosphate or its derivative.

The content of the stabilizer may be within a range not to remarkably impair the effects of the present invention, and is preferably from 1 mass ppm to 10 mass %, more preferably from 5 mass ppm to 5 mass % in the propellant composition (100 mass %).

Impurities in Propellant Composition

The sprayer is usually stored for a predetermined time from its production until its use. Accordingly, there may be problems if the propellant composition contains the after-described impurities in a predetermined amount or more. The amount of each impurity is preferably at most a predetermined amount.

Acid Content

If an acid content is present in the propellant composition, it has adverse effects such as decomposition of a component contained in the propellant or the spray chemical agent. The concentration of the acid content in the propellant composition is, as the concentration by acid-alkali titration method, preferably less than 1 mass ppm, particularly preferably at most 0.8 mass ppm. The concentration of a predetermined component in the propellant composition means a mass proportion of the content of the component to the total amount of the propellant composition.

Moisture

If moisture is included in the propellant composition, problems such as hydrolysis of a component contained in the propellant or the spray chemical agent, material deterioration by an acid component generated in the container, and contaminants may arise. The moisture content in the propellant composition is, as the moisture content measured by Karl Fischer coulometric titration method, preferably at most 20 mass ppm, particularly preferably at most 15 mass ppm to the total amount of the propellant composition.

Air

If air (nitrogen: about 80 vol %, oxygen: about 20 vol %) is included in the propellant composition, it has adverse effects over the performance of the propellant composition, and accordingly it is necessary to prevent inclusion of air as far as possible. Particularly, oxygen in air reacts with the propellant component and promotes its decomposition. The air concentration in the propellant composition is, as the air concentration measured by gas chromatography, preferably less than 15,000 mass ppm, particularly preferably at most 8,000 mass ppm.

The embodiments of the sprayer and the propellant composition of the present invention were described above, however, the sprayer and the propellant composition of the present invention are not limited to the above embodiments. Various changes and modifications are possible without departing from the intention and the scope of the present invention.

EXAMPLES

Now, Examples of the present invention will be described. In this specification, as the vapor pressure of the propellant, the vapor pressure of 1224yd is a physical property value described in Akasaka, R., Fukushima, M., Lemmon, E. W., "A Helmholtz Energy Equation of State for cis-1-chloro-2,3,3,3-tetrafluoropropene (R-1224yd(Z))", European Conference on Thermophysical Properties, Graz, Austria, Sep. 3-8, 2017, and vapor pressures of compounds other than 1224yd are values calculated by REFPROP ver. 9.1 based on physical property values of REFPROP ver. 9.1 of NIST (National Institute of Standards and Technology).

Ex. 1

With respect to a propellant comprising 1224yd(Z) and propane mixed in a proportion as identified in Table 2, the vapor pressure [MPa] at each of 0° C., 25° C. and 35° C. and the heat of combustion [MJ/kg] were calculated. The results are shown in Table 2. The following is evident from Table 2.

In order that the vapor pressure of the propellant at 0° C. is higher than atmospheric pressure, the proportion of propane to the total amount of 1224yd and propane is preferably at least 10 mass %. Further, in order that the vapor pressure of the propellant at 35° C. is at most 0.8 MPaG, the proportion of propane to the total amount of 1224yd and propane is preferably at most 40 mass %. In order that the heat of combustion of the propellant is at most 20 MJ/kg, the proportion of propane to the total amount of 1224yd and propane is preferably at most 30 mass %.

TABLE 2

| Composition [mass %] | | Vapor pressure [MPa] | | | Heat of combustion |
| --- | --- | --- | --- | --- | --- |
| 1224 yd (Z) | Propane | 0° C. | 25° C. | 35° C. | (MJ/kg) |
| 90 | 10 | 0.183 | 0.380 | 0.492 | 10.1 |
| 80 | 20 | 0.257 | 0.521 | 0.669 | 14.1 |
| 70 | 30 | 0.309 | 0.621 | 0.796 | 18.2 |
| 60 | 40 | 0.348 | 0.699 | 0.894 | 22.2 |
| 50 | 50 | 0.379 | 0.761 | 0.973 | 26.2 |
| 40 | 60 | 0.405 | 0.812 | 1.038 | 30.3 |
| 30 | 70 | 0.426 | 0.855 | 1.093 | 34.3 |
| 20 | 80 | 0.445 | 0.892 | 1.141 | 38.3 |
| 10 | 90 | 0.461 | 0.924 | 1.182 | 42.4 |

Ex. 2

With respect to the propellant comprising 1224yd(Z) and butane mixed in a proportion as identified in Table 3, the vapor pressure [MPa] at each of 0° C., 25° C. and 35° C. and the heat of combustion [MJ/kg] were calculated. The results are shown in Table 3. The following is evident from Table 3.

In order that the vapor pressure of the propellant at 0° C. is higher than atmospheric pressure, the proportion of butane to the total amount of 1224yd and butane is preferably higher than 90 mass %. On the other hand, taking the heat of combustion of the propellant as an index, in order to adjust it to be at most 30 MJ/kg, the proportion of butane to the total amount of 1224yd and butane is preferably at most 60 mass %, and in order to adjust it to be at most 20 MJ/kg, the proportion is preferably at most 30 mass %.

TABLE 3

| Composition [mass %] | | Vapor pressure [MPa] | | | Heat of combustion |
|---|---|---|---|---|---|
| 1224 yd(Z) | Butane | 0° C. | 25° C. | 35° C. | (MJ/kg) |
| 90 | 10 | 0.068 | 0.172 | 0.238 | 10.0 |
| 80 | 20 | 0.076 | 0.188 | 0.258 | 14.0 |
| 70 | 30 | 0.082 | 0.200 | 0.274 | 18.0 |
| 60 | 40 | 0.087 | 0.210 | 0.286 | 21.9 |
| 50 | 50 | 0.091 | 0.218 | 0.296 | 25.9 |
| 40 | 60 | 0.094 | 0.225 | 0.305 | 29.9 |
| 30 | 70 | 0.097 | 0.230 | 0.312 | 33.8 |
| 20 | 80 | 0.099 | 0.235 | 0.318 | 37.8 |
| 10 | 90 | 0.101 | 0.240 | 0.324 | 41.8 |

Ex. 3

With respect to the propellant comprising 1224yd(Z) and isobutane mixed in a proportion as identified in Table 4, the vapor pressure [MPa] at each of 0° C., 25° C. and 35° C. and the heat of combustion [MJ/kg] were calculated. The results are shown in Table 4. The following is evident from Table 4.

In order that the vapor pressure of the propellant at 0° C. is higher than atmospheric pressure, the proportion of isobutane to the total amount of 1224yd and isobutane is preferably at least 30 mass %. On the other hand, taking the heat of combustion of the propellant as an index, in order to adjust it to be at most 30 MJ/kg, the proportion of isobutane to the total amount of 1224yd and isobutane is preferably at most 60 mass %, and in order to adjust it to be at most 20 MJ/kg, the proportion is preferably at most 30 mass %.

TABLE 4

| Composition [mass %] | | Vapor pressure [MPa] | | | Heat of combustion |
|---|---|---|---|---|---|
| 1224 yd(Z) | Isobutane | 0° C. | 25° C. | 35° C. | (MJ/kg) |
| 90 | 10 | 0.080 | 0.196 | 0.269 | 10.0 |
| 80 | 20 | 0.097 | 0.230 | 0.311 | 14.0 |
| 70 | 30 | 0.110 | 0.256 | 0.345 | 17.9 |
| 60 | 40 | 0.121 | 0.278 | 0.372 | 21.9 |
| 50 | 50 | 0.130 | 0.295 | 0.394 | 25.8 |
| 40 | 60 | 0.137 | 0.310 | 0.412 | 29.8 |
| 30 | 70 | 0.143 | 0.322 | 0.428 | 33.7 |
| 20 | 80 | 0.148 | 0.333 | 0.442 | 37.7 |
| 10 | 90 | 0.153 | 0.342 | 0.454 | 41.6 |

Ex. 4

With respect to the propellant comprising 1224yd(Z) and DME mixed in a proportion as identified in Table 5, the vapor pressure [MPa] at each of 0° C., 25° C. and 35° C. and the heat of combustion [MJ/kg] were calculated. The results are shown in Table 5. The following is evident from Table 5.

In order that the vapor pressure of the propellant at 0° C. is higher than atmospheric pressure, the proportion of DME to the total amount of 1224yd and DME is preferably at least 10 mass %. On the other hand, taking the heat of combustion of the propellant as an index, in order to adjust it to be at most 20 MJ/kg, the proportion of DME to the total amount of 1224yd and DME is preferably at most 60 mass %.

TABLE 5

| Composition [mass %] | | Vapor pressure [MPa] | | | Heat of combustion |
|---|---|---|---|---|---|
| 1224 yd(Z) | DME | 0° C. | 25° C. | 35° C. | (MJ/kg) |
| 90 | 10 | 0.121 | 0.278 | 0.373 | 8.4 |
| 80 | 20 | 0.158 | 0.355 | 0.473 | 10.6 |
| 70 | 30 | 0.183 | 0.411 | 0.545 | 12.9 |
| 60 | 40 | 0.203 | 0.453 | 0.600 | 15.2 |
| 50 | 50 | 0.219 | 0.487 | 0.644 | 17.5 |
| 40 | 60 | 0.232 | 0.515 | 0.681 | 19.7 |
| 30 | 70 | 0.243 | 0.538 | 0.712 | 22.0 |
| 20 | 80 | 0.252 | 0.558 | 0.738 | 24.3 |
| 10 | 90 | 0.260 | 0.575 | 0.760 | 26.6 |

Ex. 5

With respect to the propellant comprising 1224yd(Z) and 1234yf mixed in a proportion as identified in Table 6, the vapor pressure [MPa] at each of 0° C., 25° C. and 35° C. and the heat of combustion [MJ/kg] were calculated. The results are shown in Table 6. The following is evident from Table 6.

In order that the vapor pressure of the propellant at 0° C. is higher than atmospheric pressure, the proportion of 1234yf to the total amount of 1224yd and 1234yf is preferably at least 20 mass %.

TABLE 6

| Composition [mass %] | | Vapor pressure [MPa] | | | Heat of combustion |
|---|---|---|---|---|---|
| 1224 yd(Z) | 1234yf | 0° C. | 25° C. | 35° C. | (MJ/kg) |
| 90 | 10 | 0.100 | 0.233 | 0.314 | 6.6 |
| 80 | 20 | 0.134 | 0.302 | 0.402 | 7.0 |
| 70 | 30 | 0.164 | 0.362 | 0.478 | 7.5 |
| 60 | 40 | 0.190 | 0.415 | 0.547 | 7.9 |
| 50 | 50 | 0.213 | 0.465 | 0.611 | 8.4 |
| 40 | 60 | 0.235 | 0.511 | 0.671 | 8.9 |
| 30 | 70 | 0.256 | 0.556 | 0.729 | 9.3 |
| 20 | 80 | 0.276 | 0.599 | 0.785 | 9.8 |
| 10 | 90 | 0.296 | 0.641 | 0.841 | 10.3 |

Ex. 6

With respect to the propellant comprising 1224yd(Z) and 1234ze(E) mixed in a proportion as identified in Table 7, the vapor pressure [MPa] at each of 0° C., 25° C. and 35° C. and the heat of combustion [MJ/kg] were calculated. The results are shown in Table 6. The following is evident from Table 6.

In order that the vapor pressure of the propellant at 0° C. is higher than atmospheric pressure, the proportion of 1234ze(E) to the total amount of 1224yd and 1234ze(E) is preferably at least 20 mass %.

TABLE 7

| Composition [mass %] | | Vapor pressure [MPa] | | | Heat of combustion |
|---|---|---|---|---|---|
| 1224 yd(Z) | 1234ze(E) | 0° C. | 25° C. | 35° C. | (MJ/kg) |
| 90 | 10 | 0.087 | 0.212 | 0.289 | 6.5 |
| 80 | 20 | 0.110 | 0.260 | 0.352 | 6.9 |
| 70 | 30 | 0.129 | 0.301 | 0.406 | 7.3 |
| 60 | 40 | 0.145 | 0.337 | 0.453 | 7.7 |
| 50 | 50 | 0.159 | 0.368 | 0.495 | 8.1 |
| 40 | 60 | 0.172 | 0.397 | 0.533 | 8.5 |
| 30 | 70 | 0.184 | 0.425 | 0.569 | 8.9 |
| 20 | 80 | 0.195 | 0.450 | 0.603 | 9.3 |
| 10 | 90 | 0.206 | 0.475 | 0.636 | 9.7 |

Ex. 7

Each of propane, DME, 1234yf and 1234ze(E) was mixed with 1224yd(Z), and the vapor pressure [MPaG] at 35° C. was adjusted to be 0.7, and the vapor pressure [MPaG] of the composition at 0° C. was obtained. The difference in the vapor pressure between at 0° C. and at 35° C. was taken as a pressure change under an adjusted vapor pressure of 0.7 [MPaG]. Likewise, the difference in the vapor pressure between at 0° C. and at 35° C. under an adjusted vapor pressure of from 0.6 to 0.3 [MPaG] were obtained as pressure changes. The results are shown in Table 8. Blanks in Table 8 represent cases where the adjusted vapor pressure cannot be achieved.

TABLE 8

| Adjusted vapor pressure | Pressure change by temperature change (0° C.-35° C.) [MPaG] | | | |
|---|---|---|---|---|
| [MPaG] | Propane | DME | 1234yf | 1234ze(E) |
| 0.7 | 0.49 | | 0.52 | |
| 0.6 | 0.43 | 0.46 | 0.46 | |
| 0.5 | 0.37 | 0.40 | 0.39 | 0.41 |
| 0.4 | 0.31 | 0.33 | 0.33 | 0.34 |
| 0.3 | 0.26 | 0.27 | 0.27 | 0.27 |

It is found from Table 8 that propane forms a mixture with 1224yd(Z) of which the pressure change by a temperature change is small.

REFERENCE SYMBOLS

10: sprayer, 1: container, 11: opening, 12: accommodating portion, 2: spray unit, 20: button, 21: spray nozzle, 22: nozzle, G: propellant vapor phase portion, L: propellant liquid phase portion, E: spray chemical agent This application is a continuation of PCT Application No. PCT/JP2018/036102, filed on Sep. 27, 2018, which is based upon and claims the benefit of priority from Japanese Patent Application No. 2017-187614 filed on Sep. 28, 2017. The contents of those applications are incorporated herein by reference in their entireties.

What is claimed is:

1. A pressurized container system, comprising:
   a composition comprising 1-chloro-2,3,3,3-tetrafluoropropene and a pressurizing agent;
   a container configured to seal the composition inside the container; and
   a discharge portion configured to discharge the composition from the container toward an outside of the container through a flow path upon opening of the flow path, wherein the pressurizing agent has a boiling point of 0° C. or lower.

2. The system according to claim 1, wherein the pressurizing agent comprises at least one selected from the group consisting of propane, butane, isobutane, dimethyl ether, a hydrofluoroolefin, a hydrofluorocarbon, carbon dioxide, compressed air, nitrous oxide and nitrogen.

3. The system according to claim 1, wherein the pressurizing agent comprises at least one selected from the group consisting of carbon dioxide, compressed air, nitrous oxide and nitrogen.

4. The system according to claim 1, wherein the pressurizing agent comprises nitrogen.

5. The system according to claim 1, wherein a vapor pressure of the composition at 0° C. is higher than atmospheric pressure.

6. The system according to claim 1, wherein a pressure of the composition in the container at 35° C. is 0.8 MPaG or less.

7. The system according to claim 1, wherein a content of 1-chloro-2,3,3,3-tetrafluoropropene with respect to a total amount of the composition is from 10 to 90% by mass.

8. The system according to claim 1, wherein 1-chloro-2,3,3,3-tetrafluoropropene consists of (Z)-1-chloro-2,3,3,3-tetrafluoropropene and (E)-1-chloro-2,3,3,3-tetrafluoropropene, and a proportion of (Z)-1-chloro-2,3,3,3-tetrafluoropropene to a total amount of 1-chloro-2,3,3,3-tetrafluoropropene is from 50 to 99.99% by mass.

9. The system according to claim 1, wherein the composition has an acid content concentration of less than 1 ppm by mass, the acid content concentration being measured by an acid-alkali titration method.

10. The system according to claim 1, wherein the composition has a moisture content of 20 ppm by mass or less, the moisture content being measured by a Karl Fischer coulometric titration method.

11. The system according to claim 1, wherein the composition in the container comprises a liquid phase portion and a gaseous phase portion, and wherein the system is configured to discharge the liquid phase portion by a pressure of the gaseous phase portion.

12. The system according to claim 1, wherein a vapor pressure of the composition in the container at 0° C. is higher than atmospheric pressure.

13. The system according to claim 1, wherein the discharge portion comprises a discharge nozzle and the flow path, wherein the flow path is connected to the discharge nozzle.

14. A method of storing a composition, the method comprising
   storing a composition comprising 1-chloro-2,3,3,3-tetrafluoropropene and a pressurizing agent in the system according to claim 1.

* * * * *